United States Patent
Numata

(10) Patent No.: US 11,521,406 B2
(45) Date of Patent: Dec. 6, 2022

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Kenichi Numata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 306 days.

(21) Appl. No.: 16/352,867

(22) Filed: Mar. 14, 2019

(65) Prior Publication Data
US 2019/0325213 A1    Oct. 24, 2019

(30) Foreign Application Priority Data
Apr. 20, 2018 (JP) .............................. JP2018-081540

(51) Int. Cl.
| | | |
|---|---|---|
| G06F 3/0483 | (2013.01) | |
| G06F 40/216 | (2020.01) | |
| G06V 30/416 | (2022.01) | |
| G06F 40/143 | (2020.01) | |
| G06F 16/28 | (2019.01) | |
| G06F 9/54 | (2006.01) | |

(52) U.S. Cl.
CPC .......... *G06V 30/416* (2022.01); *G06F 3/0483* (2013.01); *G06F 9/542* (2013.01); *G06F 16/288* (2019.01); *G06F 40/143* (2020.01); *G06F 40/216* (2020.01)

(58) Field of Classification Search
CPC ............ G06K 9/00469; G06K 2209/01; G06F 40/143; G06F 40/216; G06F 16/288; G06F 9/542; G06F 3/0483; G06Q 10/103; G06Q 10/0633
See application file for complete search history.

(56) References Cited

U.S. PATENT DOCUMENTS

| | | | | |
|---|---|---|---|---|
| 4,503,499 A | * | 3/1985 | Mason ................... | G06Q 10/10 709/206 |
| 6,898,579 B1 | * | 5/2005 | Durfee ................. | G06Q 50/188 705/50 |
| 2003/0033167 A1 | * | 2/2003 | Arroyo ................ | G06Q 10/103 705/7.42 |

(Continued)

FOREIGN PATENT DOCUMENTS

JP        2003-296560        10/2003

OTHER PUBLICATIONS

JP2003296560A—Electronic approval work flow system and memory medium—Google Patents, pub. Oct. 17, 2003, pp. 8 (Year: 2003).*

*Primary Examiner* — Stephen S Hong
*Assistant Examiner* — Ahamed I Nazar
(74) *Attorney, Agent, or Firm* — JCIPRNET

(57) ABSTRACT

An information processing apparatus includes an acquisition unit that acquires a designated first component among one or more components which configure a document; a specification unit that specifies a second component, which has a determined relation with respect to the first component, among the components; and a notification unit that provides a notification of a request of an approval with respect to the first component to an approver in a case where all specified second components are approved.

11 Claims, 9 Drawing Sheets

(56) References Cited

U.S. PATENT DOCUMENTS

| | | | | |
|---|---|---|---|---|
| 2003/0177070 | A1* | 9/2003 | Viswanath | G06Q 99/00 705/500 |
| 2005/0014122 | A1* | 1/2005 | Ruvinsky | G09B 7/02 434/350 |
| 2005/0108363 | A1* | 5/2005 | Torigoe | G06F 16/9535 709/218 |
| 2006/0218030 | A1* | 9/2006 | Ghosh | G06Q 10/063114 705/7.26 |
| 2007/0277091 | A1* | 11/2007 | Torigoe | G06F 16/2358 715/234 |
| 2008/0243807 | A1* | 10/2008 | Gaucas | G06F 16/332 |
| 2010/0211482 | A1* | 8/2010 | Nambiar | G06Q 10/087 705/30 |
| 2013/0218829 | A1* | 8/2013 | Martinez | G06Q 10/10 707/608 |
| 2014/0359411 | A1* | 12/2014 | Botta | G06F 40/197 715/205 |
| 2017/0053244 | A1* | 2/2017 | Khalil | G06Q 10/103 |
| 2017/0287090 | A1* | 10/2017 | Hunn | G06Q 50/18 |

* cited by examiner

FIG. 3

| COMPONENT ID | DOCUMENT ID | COMPONENT NAME |
|---|---|---|
| C001 | BookA | VOLUME 1 |
| C002 | BookA | VOLUME 1, CHAPTER 1 |
| C003 | BookA | VOLUME 1, CHAPTER 1, PARAGRAPH 1 |
| C004 | BookA | VOLUME 1, CHAPTER 1, PARAGRAPH 2 |
| C005 | BookA | VOLUME 1, CHAPTER 2 |
| C006 | BookA | VOLUME 1, CHAPTER 3 |
| ... | ... | ... |
| C106 | BookB | VOLUME 1, CHAPTER 2 |
| ... | ... | ... |

| COMPONENT ID | APPROVER ID | PROGRESSING STATE |
|---|---|---|
| C001 | U1 | NON-NOTIFICATION |
| C002 | U2 | COMPLETION OF NOTIFICATION |
| C003 | U3 | COMPLETION OF APPROVAL |
| C004 | U4 | WAITING FOR REQUEST |
| ... | ... | ... |

| COMPONENT ID | COMPONENT ID OF COMPONENT WHICH HAS DETERMINED RELATION |
|---|---|
| C001 | C002, C003, C004, ⋯ |
| C002 | C003, C004 |
| C003 | C106 |
| C004 | |
| C005 | |
| C006 | C007 ⋯ |
| ⋯ | ⋯ |
| C106 | C107, C108 ⋯ |
| ⋯ | ⋯ |

123

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-081540 filed Apr. 20, 2018.

BACKGROUND (i) Technical Field

The present invention relates to an information processing apparatus, an information processing system, and a non-transitory computer readable medium storing a program.

(ii) Related Art

JP2003-296560A discloses an electronic approval work flow system which, in a case where a plurality of types of electronic documents that require approvals, estimated approvers for the electronic documents, and approval works are registered, stores conditions that require approvals for respective types of the aggregated electronic documents and for respective estimated approvers.

SUMMARY

In recent years, a document (structured document), which is structured by a markup language or the like, is widely used. Since components which configure the document are clear in the structured document, it is considered that an approval target is set in units of components instead of in units of documents. In this case, an approver may perform an approval only for components which are handled by the approver, and thus it is possible to perform approvals for a plurality of components, which are included in one document, by respective approvers in parallel.

However, in a case where there is a predetermined relation between components, it is necessary for the approver to check not only approval target components but also components which have the relation with the approval target components. Specifically, in a case where approvals for the components which have the relation are performed by another person, a timing in which the approver approves the components is under the control of progressing of the approvals by another person, and thus it is difficult to perform management. Aspects of non-limiting embodiments of the present disclosure relate to an information processing apparatus, an information processing system, and a non-transitory computer readable medium storing a program, which reduce loads on an approver to manage an approval target component.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an acquisition unit that acquires a designated first component among one or more components which configure a document; a specification unit that specifies a second component, which has a determined relation with respect to the first component, among the components; and a notification unit that provides a notification of a request of an approval with respect to the first component to an approver in a case where all of specified second components are approved.

BRIEF DESCRIPTION OF THE DRAWINGS

Exemplary embodiment(s) of the present invention will be described in detail based on the following figures, wherein:

FIG. 3 is a diagram illustrating an example of a component DB 121 which is stored in a storage unit 12;

FIG. 4 is a diagram illustrating an example of an approval DB 122 which is stored in the storage unit 12;

FIG. 5 is a diagram illustrating an example of a relation DB 123 which is stored in the storage unit 12;

DETAILED DESCRIPTION

Exemplary Embodiment

Whole Configuration of Information Processing System

Figure 1:
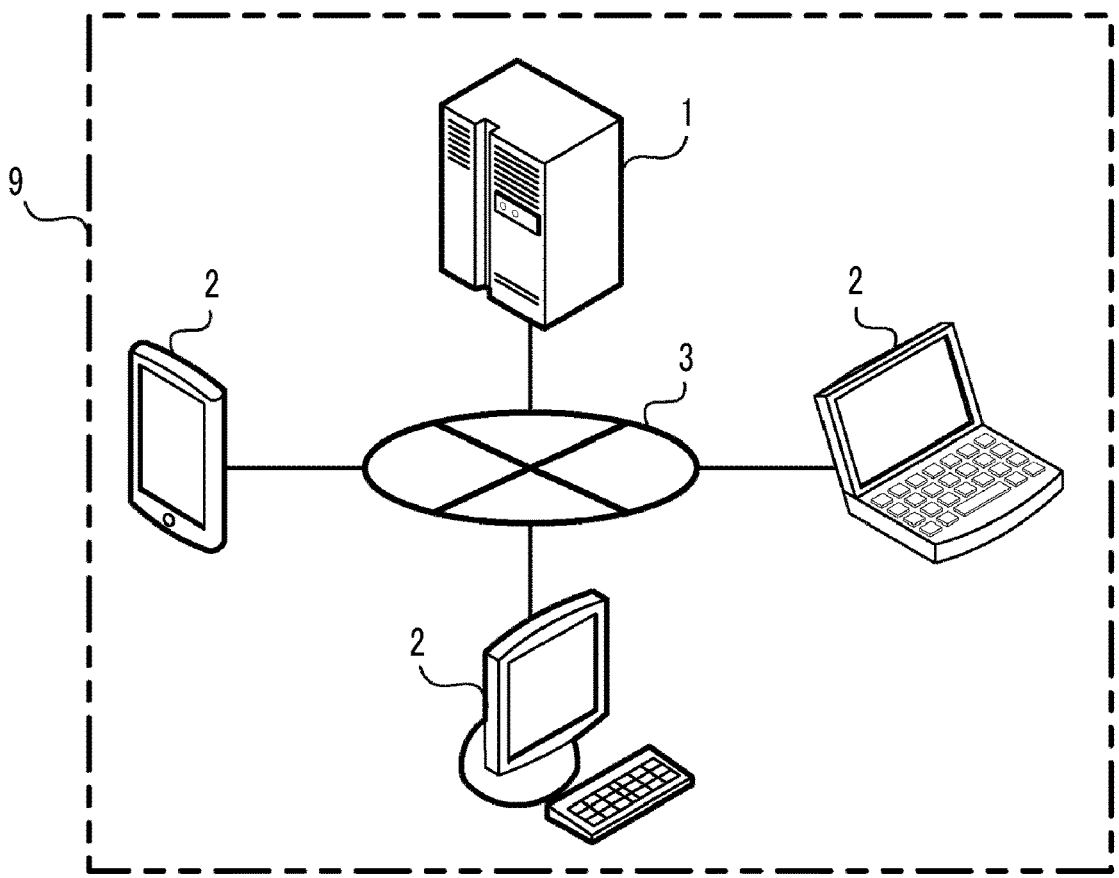
FIG. 1 is a diagram illustrating a configuration of an information processing system 9 according to an exemplary embodiment.

FIG. 1 is a diagram illustrating a configuration of an information processing system 9 according to an exemplary embodiment. The information processing system 9 includes an information processing apparatus 1, a plurality of terminals 2, and a communication line 3 which connects the information processing apparatus 1 to the plurality of terminals 2 such that communication is possible. Meanwhile, the information processing system 9 may include a plurality of information processing apparatuses 1.

The information processing apparatus 1 is an information processing apparatus which manages an approval state of a document. The "document" is information which includes a plurality of components that are respectively recorded using electronic data indicative of a text, a symbol, a drawing, and the like. A task standard, in which a way of progressing a task, a guideline, a precaution, and the like are fixed, an instruction manual of a machine, or the like is provided as an example of the document.

The terminals 2 are terminals, such as computers, which are manipulated by respective users of the information processing system 9. The users of the information processing system 9 include a writer who writes the document, an approver who approves a designated component included in the written document, a requester who requests an approval of the component from the approver, and the like.

The communication line 3 may be, for example, in addition to the Local Area Network (LAN), a Wide Area Network (WAN), the Internet, and a combination thereof. In addition, the communication line 3 may include a Public Switched Telephone Network (PSTN), an Integrated Services Digital Network (ISDN), and the like.

Configuration of Information Processing Apparatus

Figure 2:
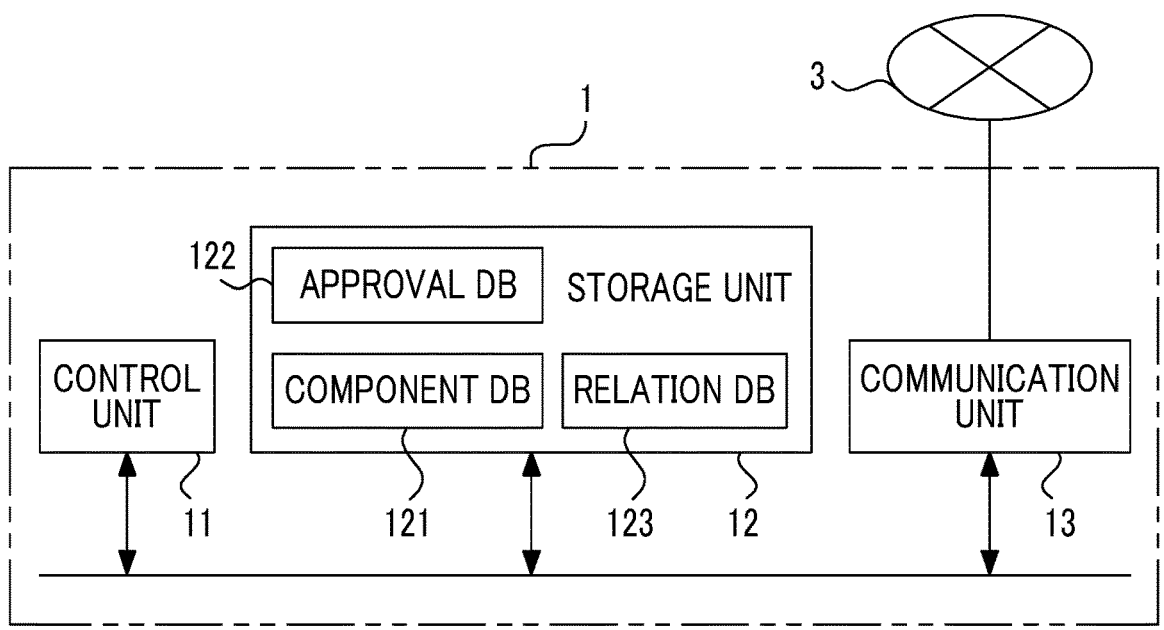
FIG. 2 is a diagram illustrating a configuration of an information processing apparatus 1.

FIG. 2 is a diagram illustrating a configuration of the information processing apparatus 1. As illustrated in FIG. 2, the information processing apparatus 1 includes a control unit 11, a storage unit 12, and a communication unit 13.

The control unit 11 includes a Central Processing Unit (CPU), a Read Only Memory (ROM), and a Random Access Memory (RAM). The CPU controls respective units of the information processing apparatus 1 by reading and executing a computer program (hereinafter, simply referred to as a program) which is stored in the ROM and the storage unit 12.

The communication unit 13 is a communication circuit which is connected to the communication line 3 in wired or wireless manner. The information processing apparatus 1 exchanges information with the terminals 2, which are connected to the communication line 3, using the communication unit 13.

The storage unit 12 is storage means, such as a hard disk drive, and stores various programs, data, and the like which are read by the CPU of the control unit 11. In addition, the storage unit 12 stores a component DB 121, an approval DB 122, and a relation DB 123.

Configuration of Component DB

FIG. 3 is a diagram illustrating an example of the component DB 121 which is stored in the storage unit 12. The component DB 121 illustrated in FIG. 3 is a database in which the document is associated with the components which configure the document.

The component DB 121 is described with a document ID, which is identification information of the document that includes the components, and a component name, which is a name of each of the components, in association with a component ID which is identification information of each of the components which configure the document. For example, a component ID of a "volume 1" of a document identified by a document ID "Book A" is "C001".

Configuration of Approval DB

FIG. 4 is a diagram illustrating an example of the approval DB 122 which is stored in the storage unit 12. The approval DB 122 illustrated in FIG. 4 is a database which stores a progressing state of an approval for each component for each of the components which configure the document.

The approval DB 122 stores an approver ID, which is identification information of the approver who is set to approve the component for each component ID of the component, and a progressing state relevant to the approval for the component in association with each other. The progressing state relevant to the approval includes four states, and transitions in order of "waiting for request"→"non-notification"→"completion of notification"→"completion of approval". Meanwhile, there is a case where the state transitions to the "completion of notification" without passing through the "non-notification" from the "waiting for request" according to a configuration of the components of the document.

According to the approval DB 122 illustrated in FIG. 4, a component which is identified by a component ID "C004" is fixed to be approved by an approver who is identified by an approver ID "U4", and the progressing state of the approval is the "waiting for request". The "waiting for request" is an initial state of the progressing state relevant to the approval for the component, and indicates a state in which a request for the approval (also referred to as a request of an approval) is not made. That is, the request of the approval for the component corresponding to the component ID "C004" is not submitted from the requester yet. The progressing state of the "waiting for request" transitions to the "non-notification" in a case where the request of the approval is submitted from the requester.

A component, which is identified by the component ID "C001", is fixed to be approved by an approver who is identified by an approver ID "U1", and a progressing state of the approval is the "non-notification". That is, the request of the approval with respect to the component is already submitted from the requester but a notification of the request of the approval is not provided to the approver yet. The progressing state "non-notification" transitions to "completion of notification" in a case where the notification of the request of the approval is provided to the approver.

A component, which is identified by a component ID "C002", is fixed to be approved by an approver who is identified by an approver ID "U2", and a progressing state of the approval is "completion of notification". That is, although the notification of the request of the approval with respect to the component is already provided to the approver, the approver does not approve the component yet. The progressing state "completion of notification" transitions to the "completion of approval" in a case where the component is approved by the approver.

A component, which is identified by a component ID "C003", is fixed to be approved by an approver who is identified by an approver ID "U3", and a progressing state of the approval is the "completion of approval". That is, the notification of the request of the approval for the component is already provided to the approver, and the approver already approves the component.

Configuration of Relation DB

FIG. 5 is a diagram illustrating an example of the relation DB 123 which is stored in the storage unit 12. The relation DB 123 illustrated in FIG. 5 is a database which stores, for each component which configures the document, a component that has a determined relation with respect to the component.

The relation DB 123 stores a certain component and a component, which has a determined relation with respect to the certain component, in association with respective component IDs. For example, the component, which is identified by the component ID "C001", is stored in association with "C002", "C003", "C004", . . . as the component IDs of the components which have a determined relation with respect to the component identified by the component ID "C001". In addition, the component, which is identified by component ID "C004", is described with nothing in the component ID of the component which has the determined relation with respect to the component identified by component ID "C004". A reason for this is that a component, which has the determined relation with respect to the component "C004", does not exist.

Figure 6:
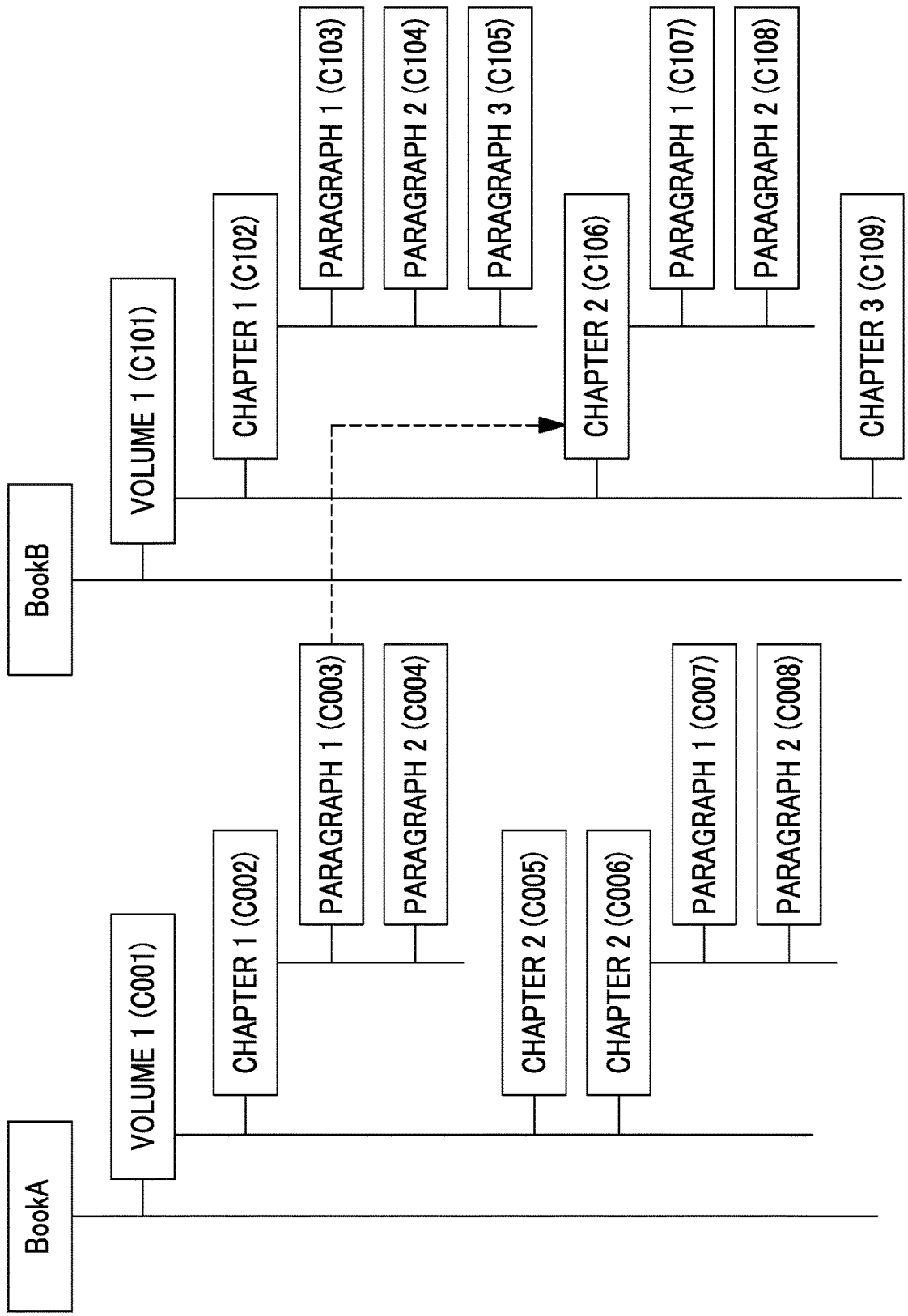
FIG. 6 is a diagram illustrating an example of a configuration of a document.

FIG. 6 is a diagram illustrating an example of a configuration of the document. The above-described "determined relation" is a relation depending on a case where a component is approved, and includes, for example, a relation of "include", "quote", or the like. In a case where "a latter which has a determined relation with respect to a former" exists, an approval for the former depends on an approval for the latter. That is, in this case, it is not possible for an approver of the former to approve the former in a case where the approval for the latter is not completed.

For example, "volume 1" of "Book A" illustrated in FIG. 6 includes "chapter 1", "chapter 2", "chapter 3", . . . . Therefore, "chapter 1", "chapter 2", and "chapter 3" are components which have a determined relation with respect to "volume 1". Furthermore, "chapter 1" includes "paragraph 1" and "paragraph 2". Therefore, "paragraph 1" and "paragraph 2" are components which have a determined relation with respect to "chapter 1" and are components which also have a determined relation with respect to "volume 1".

In addition, in the document, there is a case where a certain component quotes another component. The quotation may be described using, for example, "link" or the like in a markup language such as Hyper Text Markup Language (HTML), and may be described using a sentence like "refer to chapter 2 of volume 1 of Book B". For example, "paragraph 1 of chapter 1 of volume 1" of "Book A" illustrated in FIG. 6 quotes "chapter 2 of volume 1" of "Book B". Therefore, "chapter 2 of volume 1" of "Book B" is a component which has a determined relation with respect to "paragraph 1 of chapter 1 of volume 1" of "Book A".

Meanwhile, in description below, a designated component is referred to as a first component and a component, which has a determined relation with respect to the first component, is referred to as a second component.

That is, for example, in a case where a "relation" in "the latter which has the determined relation with respect to the former" is a relation in which "the former includes the latter", the second component (the latter) is a component which is included in the first component (the former). In addition, for example, in a case where the "relation" in "the latter which has the determined relation with respect to the former" is a relation in which "the former quotes the latter", the second component (the latter) is a component which is quoted by the first component (the former).

Configuration of Terminal

Figure 7:
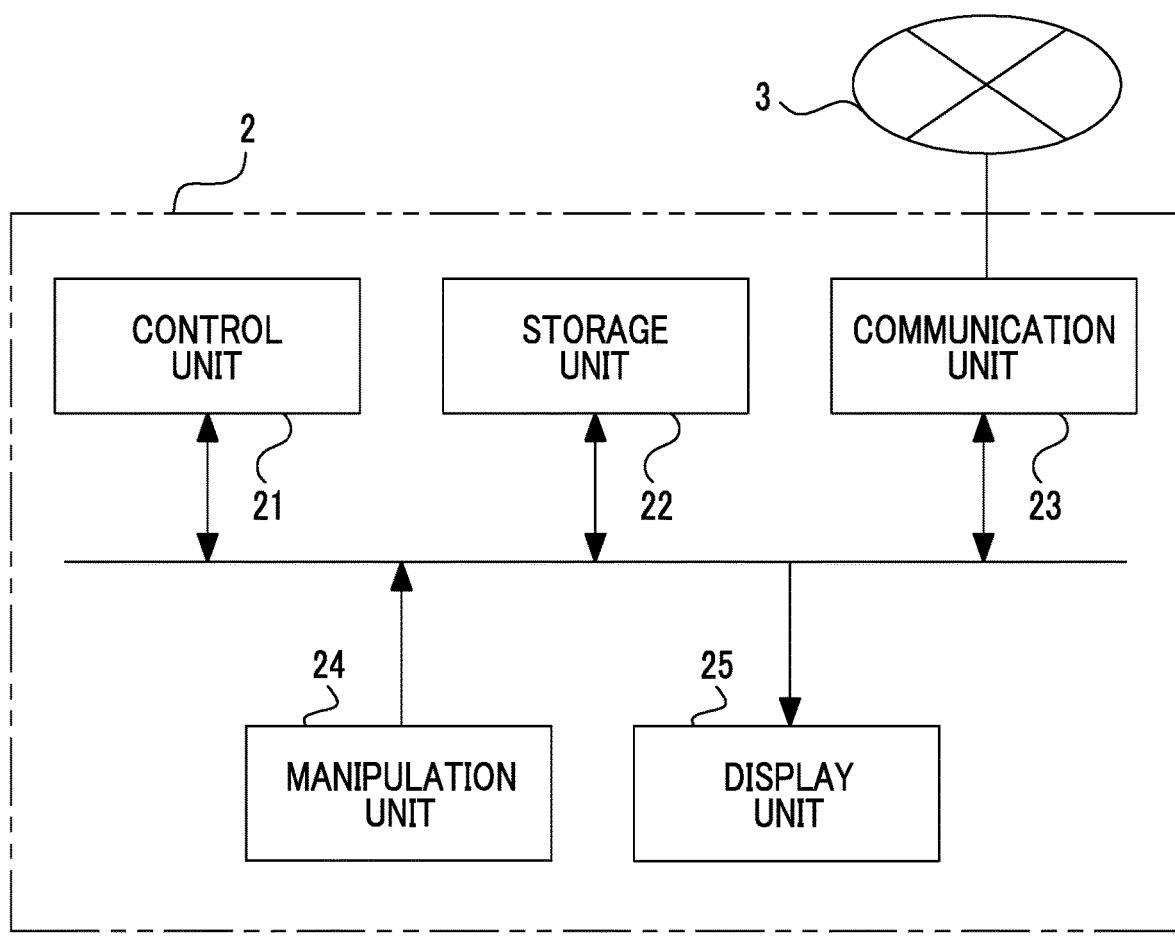
FIG. 7 is a diagram illustrating an example of a configuration of a terminal 2.

FIG. 7 is a diagram illustrating an example of a configuration of a terminal 2. The terminal 2 illustrated in FIG. 7 includes a control unit 21, a storage unit 22, a communication unit 23, a manipulation unit 24, and a display unit 25.

The control unit 21 includes a CPU, a ROM, and a RAM, and controls respective units of the terminal 2 in such a way that the CPU reads and executes a program which is stored in the ROM and the storage unit 22. The storage unit 22 is storage means, such as a solid-state drive or a hard disk drive, and stores various programs, data, and the like which are read by the CPU of the control unit 21.

The communication unit 23 is a communication circuit which is connected to the communication line 3 in the wired or wireless manner. The terminal 2 exchanges information with the information processing apparatus 1, which is connected to the communication line 3, using the communication unit 23.

The manipulation unit 24 includes manipulators, such as manipulation buttons, a keyboard, and a touch panel, in order to provide various instructions, receives manipulation performed by the user, and transmits a signal according to manipulated content to the control unit 21.

The display unit 25 includes a display screen, such as a liquid crystal display, and displays an image under the control of the control unit 21. A transparent touch panel of the manipulation unit 24 may be disposed to overlap the display screen.

Functional Configuration of Information Processing System

Figure 8:
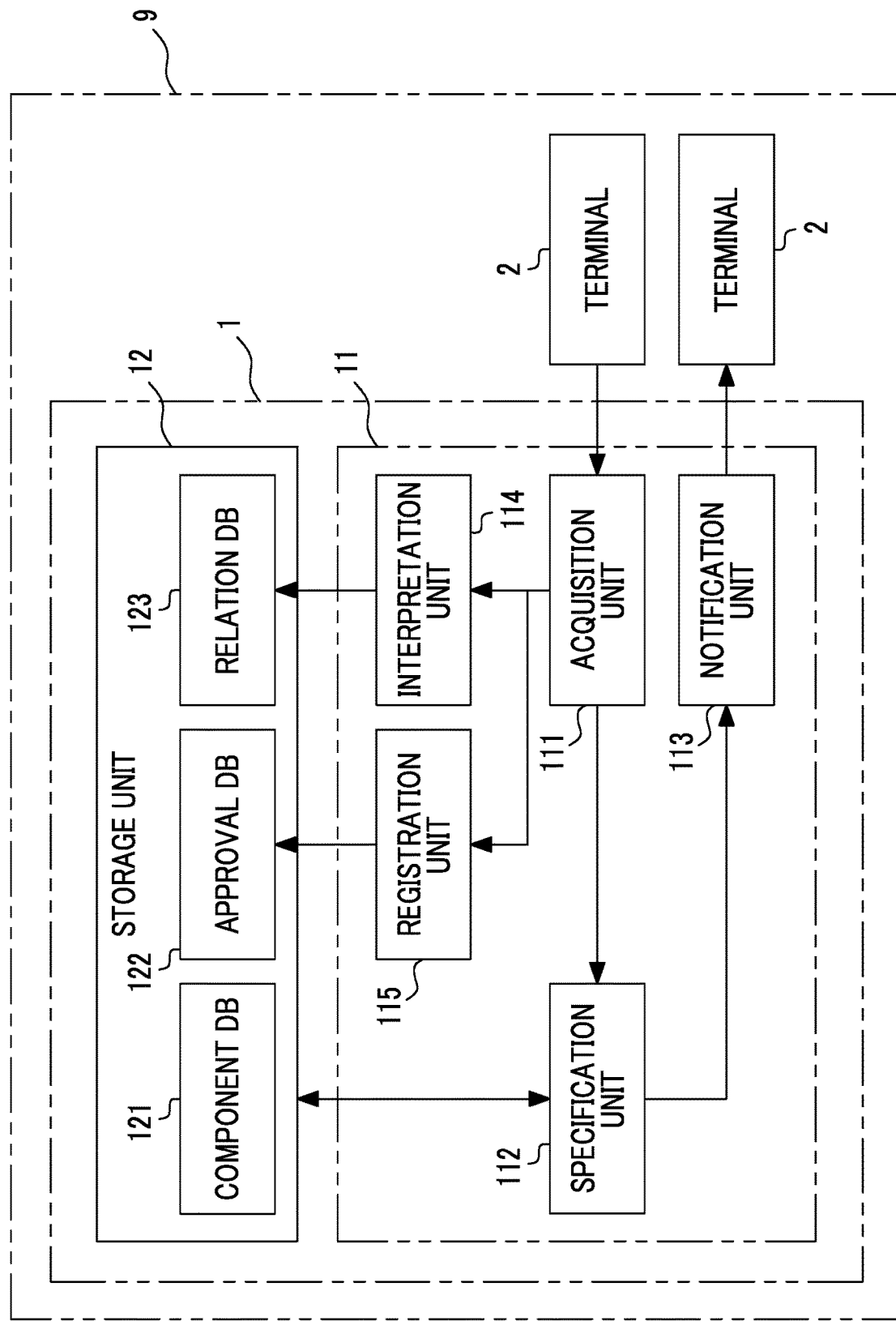
FIG. 8 is a diagram illustrating a functional configuration of the information processing system 9.

FIG. 8 is a diagram illustrating a functional configuration of the information processing system 9. In FIG. 8, the communication unit 13 and the communication line 3 of the information processing apparatus 1, and each of the configurations of the terminal 2 are not described.

A control unit 11 of the information processing apparatus 1 reads and executes a program stored in the storage unit 12, and functions as an acquisition unit 111, a specification unit 112, and a notification unit 113. In addition, the control unit 11 may further function as an interpretation unit 114 and a registration unit 115.

The acquisition unit 111 acquires an instruction according to manipulation from the terminal 2 which receives the manipulation of the user.

For example, in the terminal 2, in a case where the user (writer) who writes a document performs manipulation to instruct registration of the document, the acquisition unit 111 acquires the document and an instruction to register the document from the terminal 2.

In this case, an interpretation unit 114 interprets the document acquired by the acquisition unit 111, and extracts a component which configures the document. For example, in a case where the document is the structured document which is described using the markup language, interpretation is performed based on a tag fixed by the markup language. In addition, in a case where the document is described in a natural language, the interpretation is performed through natural language interpretation. In the natural language interpretation, a component is extracted by detecting, for example, a predetermined term (reserved word) such as "volume", "chapter", "paragraph", "clause", and "section", in the sentence.

The interpretation unit 114 assigns the component ID to each extracted component. In addition, the interpretation unit 114 specifies a relation between components based on, for example, the above-described reserved word in the sentence or the reserved word, such as "reference" or "according to . . . ", and stores the relation in the relation DB 123.

Meanwhile, in a case where it is detected that the document violates a determined method as a result of the interpretation, the information processing apparatus 1 may provide a notification that the document violates the determined method to the writer of the document. For example, in a case where the tag is not described conforming to grammar of the markup language, in a case where an order, a position, or the like of the reserved word is erroneous, and in a case where the component name in the document is not uniquely specified, the information processing apparatus 1 may detect the errors and provide a notification of the errors to the writer of the document.

In addition, the information processing apparatus 1 may detect an error of the relation between the components. For example, in a case where the second component has the determined relation with respect to the first component and an edge with an arrow, which faces a node indicative of the second component from a node indicative of the first component, is drawn, the relation between the components is expressed as a directed acyclic graph. That is, in a case where the relation between the components is expressed using the node and the edge with the arrow, it is necessary for the relation to be drawn such that a path (so-called a closed circuit) returning to an original node does not exist. A reason for this is that a sequence of the approval for the component should be uniquely determined. In a case where the relation between the components may not be expressed using the directed acyclic graph as a result of the interpretation, the information processing apparatus 1 may provide a notification that the error exists in the relation between the components to the writer of the document.

The registration unit 115 registers the document acquired by the acquisition unit 111 in the storage unit 12, and updates the approval DB 122 to set the progressing state relevant to the approvals of all the components which configure the document to "waiting for request".

In addition, for example, in the terminal 2, in a case where a user who determines the approvers of the components, which configure the document, performs manipulation to instruct registration of the approvers of the components, the acquisition unit 111 acquires the component IDs of the components and the approver IDs of the approvers of the components from the terminal 2.

In this case, the registration unit 115 receives the component IDs and the approver IDs, which are acquired by the acquisition unit 111, and associates the component IDs with the approver IDs, and registers the component IDs and the approver IDs in the approval DB 122 of the storage unit 12.

In addition, for example, in the terminal 2, in a case where the user (requester) who requests the approver to approve the components, which configure the document, designates a component and manipulates to approve the component, the acquisition unit 111 acquires the designated component (first component) and the request of the approval with respect to the component from the terminal 2. That is, the acquisition unit 111 acquires the designated first component among one or more components which configure the document.

The specification unit 112 specifies the second components, which have a determined relation with respect to the first component and which are acquired by the acquisition unit 111, among the one or more components which configure the document stored in the storage unit 12 with reference to the relation DB 123, and specifies the progressing states of the approvals for the specified second components with reference to the approval DB 122.

In a case where all the second components, which are specified by the specification unit 112, are approved, the notification unit 113 provides the notification of the request of the approval with respect to the first component to the approver. The specification unit 112 specifies the progressing states of the approvals of the second components with reference to the approval DB 122. In a case where all the second components are the "completion of approval", the specification unit 112 reports that the notification unit 113 should provide the notification of the request of the approval for the first component. The notification unit 113 provides the notification of the reported request of the approval with respect to the first component toward the terminal 2 of a relevant approver.

Meanwhile, for example, the approver ID may be stored in the storage unit 12 in association with the identification information of the terminal 2 possessed by the approver who is identified by the approver ID. In brief, in a case where the information processing apparatus 1 specifies the approver ID, the information processing apparatus 1 may be capable of providing a notification to the approver who is identified by the approver ID.

In addition, the specification unit 112 may specify a third component which includes or quotes the first component. In this case, in a case where the notification unit 113 provides the notification of the request of the approval with respect to the first component, the notification unit 113 may provide a notification of information of the third component to the approver, together with the request of the approval.

Figure 9A:
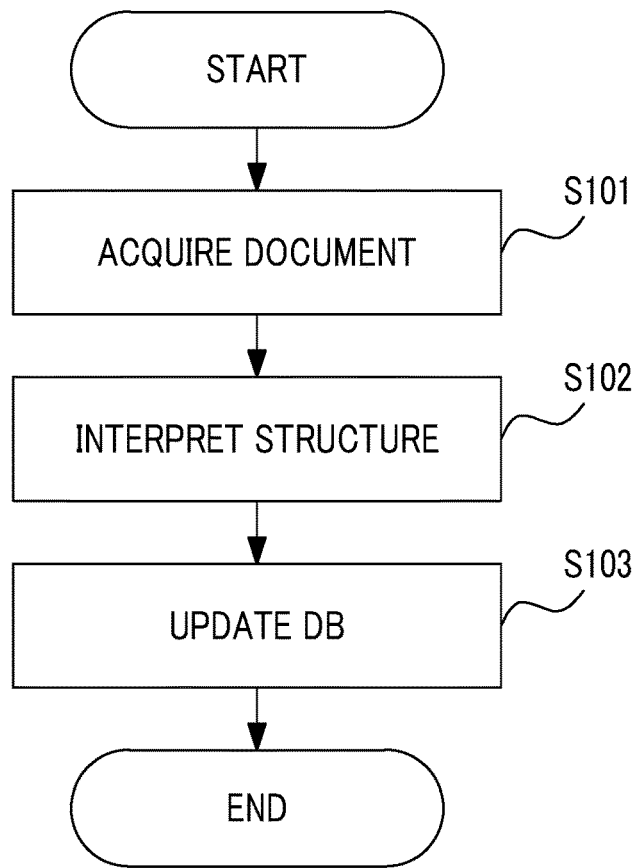
FIGS. 9A and 9B are flowcharts illustrating a flow of an operation of registering the document or an approver by the information processing apparatus 1.
Figure 9B:
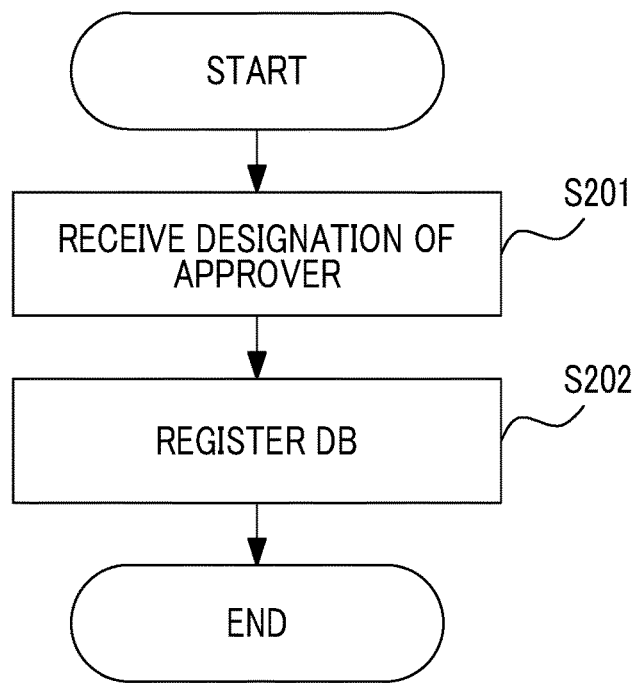

Operation of Information Processing System Operation of Registering Document or Approver FIGS. 9A and 9B are flowcharts illustrating a flow of an operation of registering the document or the approver by the information processing apparatus 1 of the information processing system 9.

As illustrated in FIG. 9A, in a case where the control unit 11 of the information processing apparatus 1 acquires a document from the terminal 2 (step S101), the control unit 11 interprets a structure of the document (step S102), and updates the component DB 121 and the relation DB 123 based on a result of the interpretation (step S103).

In addition, as illustrated in FIG. 9B, in a case where the control unit 11 of the information processing apparatus 1 receives a designation of an approver who approves a component from the terminal 2 (step S201), the control unit 11 registers an approver ID of the approver in the approval DB 122 (step S202).

Figure 10A:
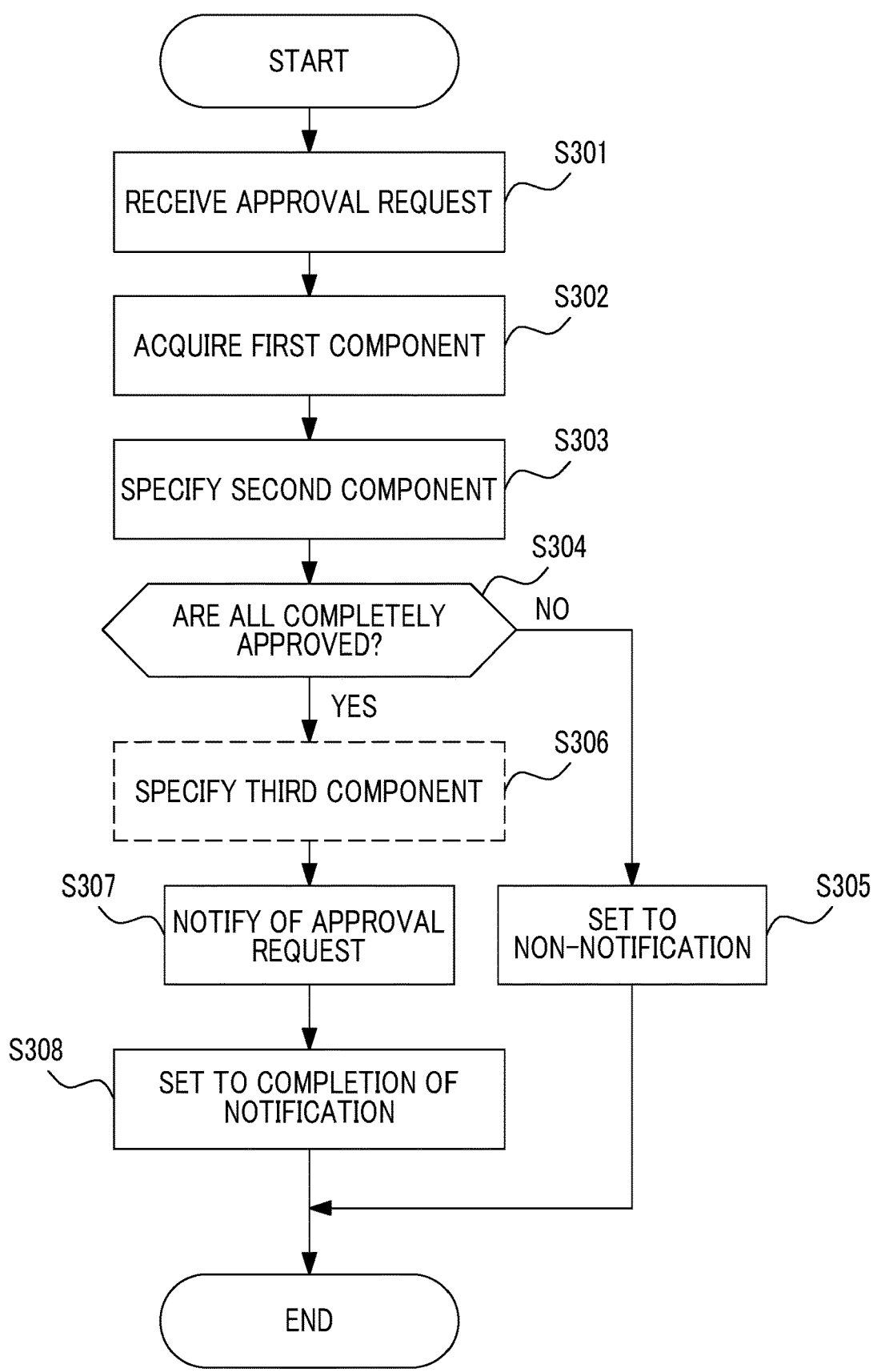
FIGS. 10A and 10B are flowcharts illustrating a flow of an operation of providing a notification of a request of an approval and updating an approval state.
Figure 10B:
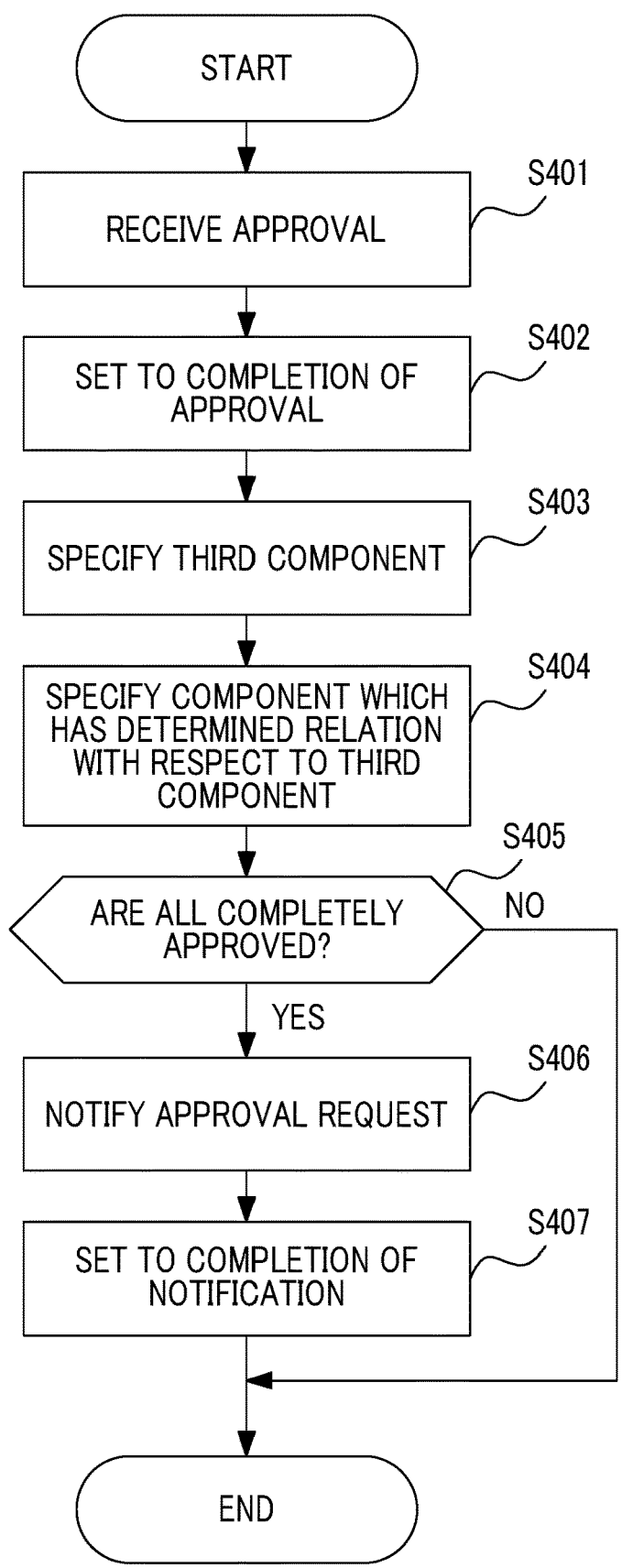

Operation of Providing Notification of Request of Approval and Updating Approval State FIGS. 10A and 10B are flowcharts illustrating a flow of an operation of providing the notification of the request of the approval and updating the approval state by the information processing apparatus 1 of the information processing system 9.

As illustrated in FIG. 10A, in a case where the control unit 11 of the information processing apparatus 1 receives the first component and a designation of the request of the approval with respect to the first component from the terminal 2 (step S301), the control unit 11 acquires the designated first component (step S302). Furthermore, the control unit 11 specifies the second components, which have a determined relation with respect to the first component, with reference to the relation DB 123 (step S303).

The control unit 11 determines whether or not all the specified second components are the "completion of approval" with reference to the approval DB 122 (step S304). In a case where it is determined that all the second components are not the "completion of approval" (step S304; NO), the control unit 11 sets the processing state of the approval with respect to the first component to the "non-notification" in the approval DB 122 (step S305), and ends the process.

In contrast, in a case where it is determined that all the second components are the "completion of approval" (step S304; YES), the control unit 11 provides the notification of the request of the approval with respect to the first component to the approver (step S307), sets the progressing state of the approval with respect to the first component to the "completion of notification" in the approval DB 122 (step S308), and ends the process.

Meanwhile, the control unit 11 may specify the third component for the first component (step S306) previous to the above-described step S307. The third component for the first component is a certain component in a case where the first component has a determined relation with respect to the certain component. That is, it is not possible for an approver of the third component to approve the third component unless the approval for the first component is completed.

For example, in a case where the "relation" in "the latter which has the determined relation with respect to the former" is a relation in which "the former includes the latter", the third component (the former) is a component which includes the first component (the latter). In addition, for example, in a case where the "relation" in "the latter which has the determined relation with respect to the former" is a relation in which "the former quotes the latter", the third component (the former) is a component which quotes the first component (the latter).

In this case, in the above-described step S307, the control unit 11 may provide the notification of the request of the approval with respect to the first component to the approver, together with the information of the third component.

As illustrated in FIG. 10B, in a case where the control unit 11 of the information processing apparatus 1 receives the approval with respect to the designated first component from the terminal 2 of the approver (step S401), the control unit 11 rewrites the approval DB 122, and sets the progressing state of the approval with respect to the designated first component to the "completion of approval" (step S402).

Furthermore, the control unit 11 specifies the third component for the designated first component (step S403), and specifies components which have a determined relation with respect to the third component (step S404).

As described above, the third component is a component in which a component, which has the determined relation with respect to the third component, is the first component. Therefore, the first component received in step S401 is included in the component specified in step S404.

The control unit 11 determines that the progressing state of the approval for the third component is not the "waiting for request" but the "non-notification" and determines whether or not all the components specified in step S404 are the "completion of approval" (step S405).

In a case where it is determined whether or not the third component is the "waiting for request" or it is determined that all the components specified in step S404 are not the "completion of approval" (step S405; NO), the control unit 11 ends the process. Meanwhile, in this case, the progressing state of the approval for the third component in the approval DB 122 is not changed while being set to the "waiting for request" or the "non-notification".

In contrast, in a case where it is determined that the third component is the "non-notification" and all the components specified in step S404 are the "completion of approval" (step S405; YES), the control unit 11 provides the notification of the request of the approval with respect to the third component to the approver (step S406), sets the progressing state of the approval for the third component to the "completion of notification" in the approval DB 122 (step S407), and ends the process. That is, in a case where a state transitions from a state, in which any one of other components which have a determined relation with respect to the component is not approved, to a state in which all the components are approved, the notification unit 113 which is realized by the control unit 11 provides the notification of the request of the approval for the component.

With the above-described operation, in the information processing system 9, the notification of the request of the approval for the first component, which configures the document, is not provided to the approver until all the second components, which have the determined relation with respect to the first component, are approved, and thus loads on the approver who manages an approval target component, is reduced.

In addition, even a requester who requests an approval is in the non-notification state until all the second components, which have the determined relation with respect to the first component, are approved after the approval for the first component is requested once, and thus it is not necessary to manage the first component which requests the approval.

Modification Example

Although the exemplary embodiment is described as described above, content of the exemplary embodiment may be modified as below. In addition, modification examples below may be combined with each other.

First Modification Example

In the above-described exemplary embodiment, it is described that the control unit 11 may specify the third component for the first component and may provide the notification of the information of the third component to the approver, together with the request of the approval with respect to the first component. However, in a case where the control unit 11 provides notifications of requests of approvals with respect to a plurality of first components, which have different pieces of information of the third components, the control unit 11 may respectively provide the notifications in different aspects according to the pieces of information of the third components.

For example, the storage unit 12 may store different weighting coefficients in association with a duty, a rank, and a position of the approver indicated by the approver ID. In a case where a common approver is fixed to the plurality of respective first components, the control unit 11 of the information processing apparatus 1 provides the notifications of the requests of the approvals, which are respectively submitted with respect to the plurality of first components, to the approver.

In this case, the control unit 11 specifies the respective third components corresponding to the plurality of first components, and reads the weighting coefficients, which are respectively fixed to the specified third components, of the approvers from the storage unit 12. Furthermore, the control unit 11 sorts the requests of the approvals for the relevant first components in order of the weighting coefficients, and transmits the sorted requests the approvals to the terminal 2.

Since the first components have the determined relation with respect to the third components, and thus the approvals for the third components depend on the approvals for the first components. That is, this means that the approvers of the first components wait for the approvers of the third components.

In the configuration, since the notifications of the requests of the approvals for the plurality of first components are provided to the terminal 2 in order according to the weighting coefficients of the approvers of the respective third components, the approvers who receive the requests of the approvals grasp a person who is the approver of the third component for which the request of the approval of the first component waits, and, in addition, recognize the first component corresponding to a lower order as the weighting coefficients of the approvers of the third components are large.

Meanwhile, the terminal 2 may display, for example, an approver name or the like using a notable color, a size, or the like as the weighting coefficient of the approver of the third component is large.

Second Modification Example

A program, which is executed by the control unit 11 of the information processing apparatus 1, may be provided in a state of being stored in a magnetic recording medium such as a magnetic tape or a magnetic disk, an optical recording medium such as an optical disk, and a computer-readable recording medium such as a magneto-optical recording medium or a semiconductor memory. In addition, the program may be downloaded through the communication line such as the Internet. Meanwhile, there is a case where, in addition to the CPU, various apparatuses are applied as control means illustrated using the above-described control unit 11, and, for example, a dedicated processor or the like is used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, configured to:
   acquire a request of an approval with respect to a designated first component that has not been approved among a plurality of components which configure a document;
   specify a plurality of second components, which are quoted by the first component, wherein the plurality of second components are specified among the plurality of components;
   determine whether each of the specified second components is approved according to a progressing state of an individual approval performed by a corresponding second approver when the request is acquired;
   provide a notification of the request to a first approver of the first component in a case where a first state transitions to a second state, wherein the first state is a state in which any one of the specified second components is not approved, and wherein the second state is a state in which all of the specified second components are approved; and
   not provide the notification of the request to the first approver of the first component in a case where the first state does not transition to the second state.

2. The information processing apparatus according to claim 1,
   wherein the processor further specifies the specified second components which are included in the first component.

3. The information processing apparatus according to claim 2,
   wherein the processor specifies a third component which includes or quotes the first component, and
   wherein the processor provides a notification of information of the third component to the first approver, together with the request of the approval with respect to the first component.

4. The information processing apparatus according to claim 3,
   wherein the processor provides the notification of the request in different aspects according to the information of the third component in a case of providing the notification of the request with respect to a plurality of first components which have different pieces of information of the third component.

5. An information processing system comprising:
   the information processing apparatus according to claim 1; and
   a terminal that receives the approval from the first approver in a case where the notification of the request of the approval is provided from the information processing apparatus.

6. An information processing system comprising:
   the information processing apparatus according to claim 3; and
   a terminal that receives the approval from the first approver in a case where the notification of the request of the approval is provided from the information processing apparatus.

7. An information processing system comprising:
   the information processing apparatus according to claim 5; and
   a terminal that receives the approval from the first approver in a case where the notification of the request of the approval is provided from the information processing apparatus.

8. An information processing system comprising:
   the information processing apparatus according to claim 4; and
   a terminal that receives the approval from the first approver in a case where the notification of the request of the approval is provided from the information processing apparatus.

9. A non-transitory computer readable medium storing a program causing a computer to:
   acquire a request of an approval with respect to a designated first component that has not been approved among a plurality of components which configure a document;
   specify a plurality of second components, which are quoted by the first component, wherein the plurality of second components are specified among the plurality of components;
   determine whether each of the specified second components is approved according to a progressing state of an individual approval performed by a corresponding second approver when the request is acquired;
   provide a notification of the request to a first approver of the first component in a case where a first state transitions to a second state, wherein the first state is a state in which any one of the specified second components is not approved, and wherein the second state is a state in which all of the specified second components are approved; and
   not provide the notification of the request to the approver of the first component in a case where the first state does not transition to the second state.

10. The information processing apparatus according to claim 1,
    wherein each of the first component and the specified second components is a component configuring a same document, and
    wherein the first component includes the specified second components in the document.

11. The information processing apparatus according to claim 1,
    wherein the plurality of second components comprise another second component, and wherein the another second component is quoted by the first component, among a plurality of components which configure another document.

* * * * *